Oct. 20, 1970   C. L. VAN OURKERK   3,534,638
SAW CHAIN SHARPENER

Filed Oct. 25, 1968   3 Sheets-Sheet 1

INVENTOR
CARROLL L. VANOURKERK

BY Robert L. Harrington
ATTORNEY

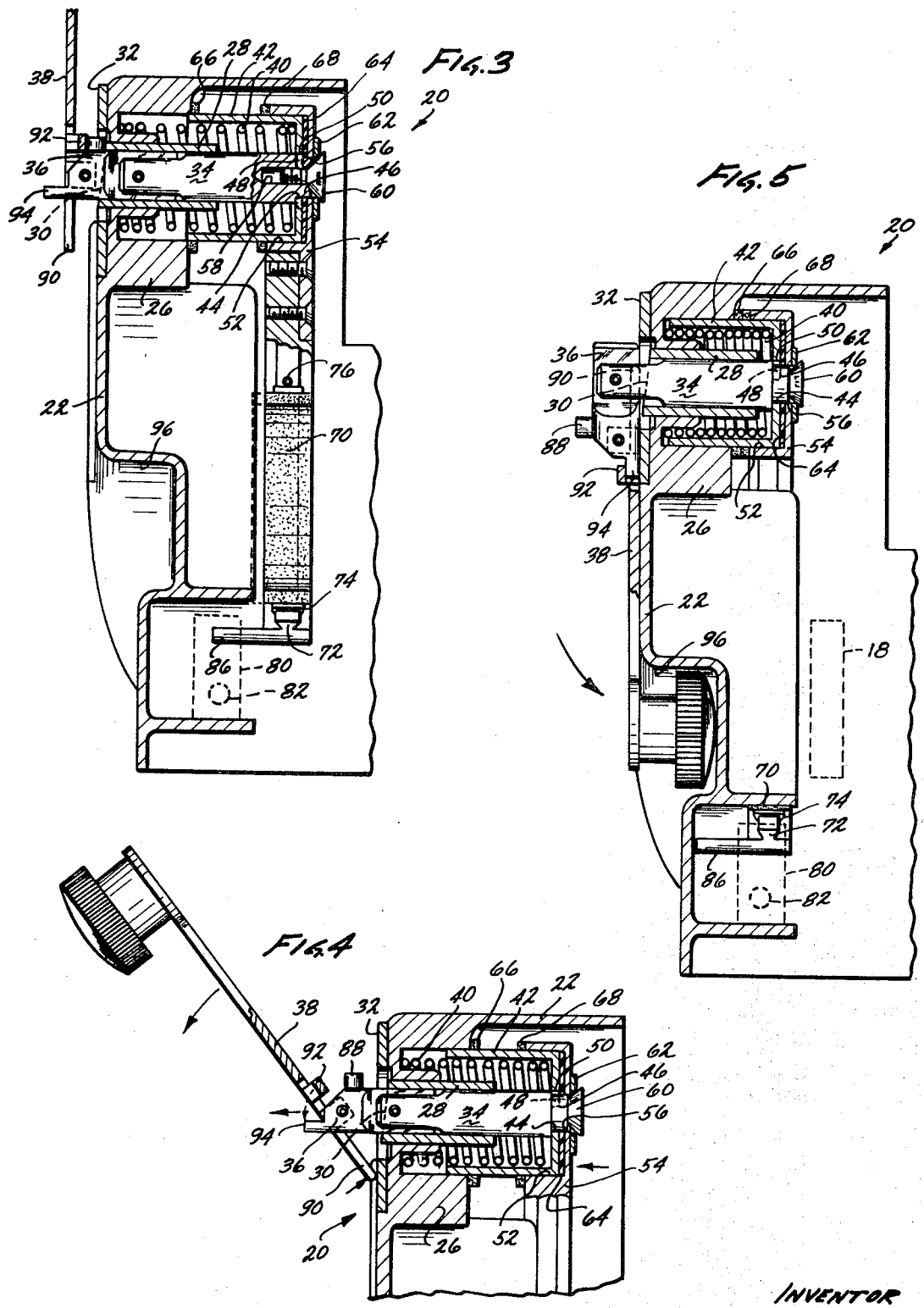

Oct. 20, 1970          C. L. VAN OURKERK          3,534,638
                      SAW CHAIN SHARPENER
Filed Oct. 25, 1968                         3 Sheets-Sheet 3
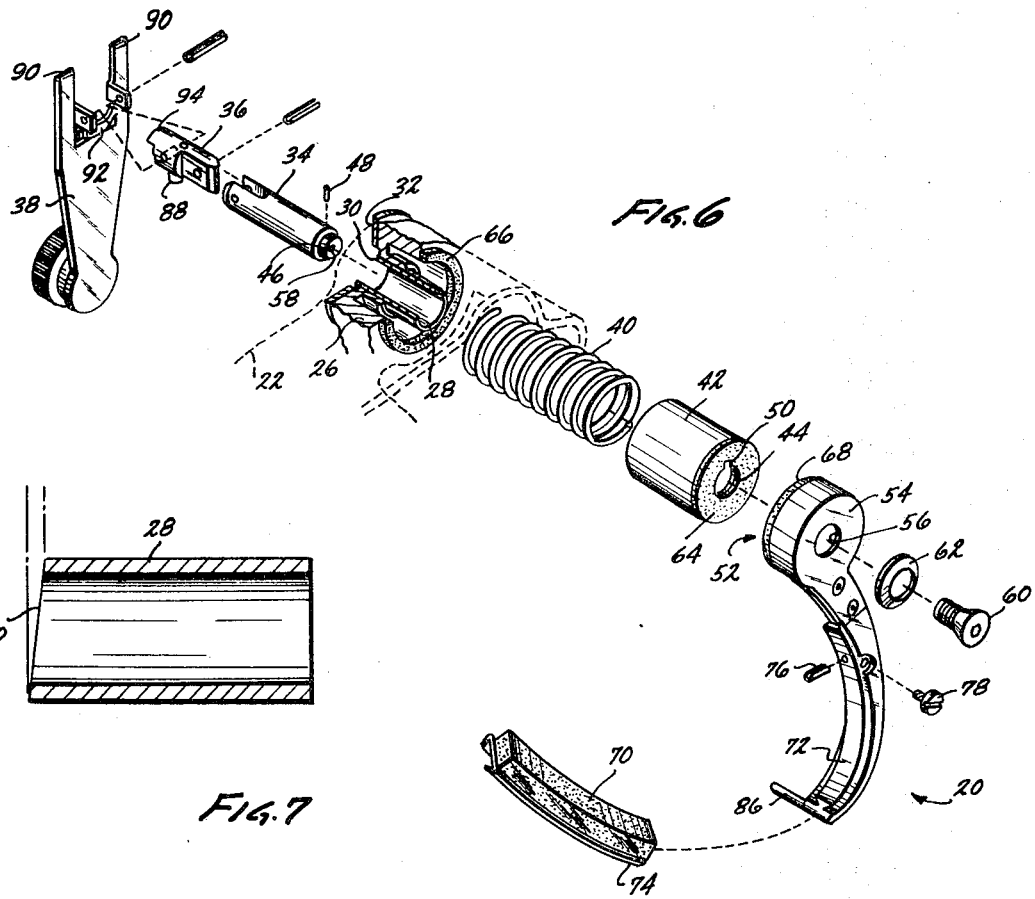
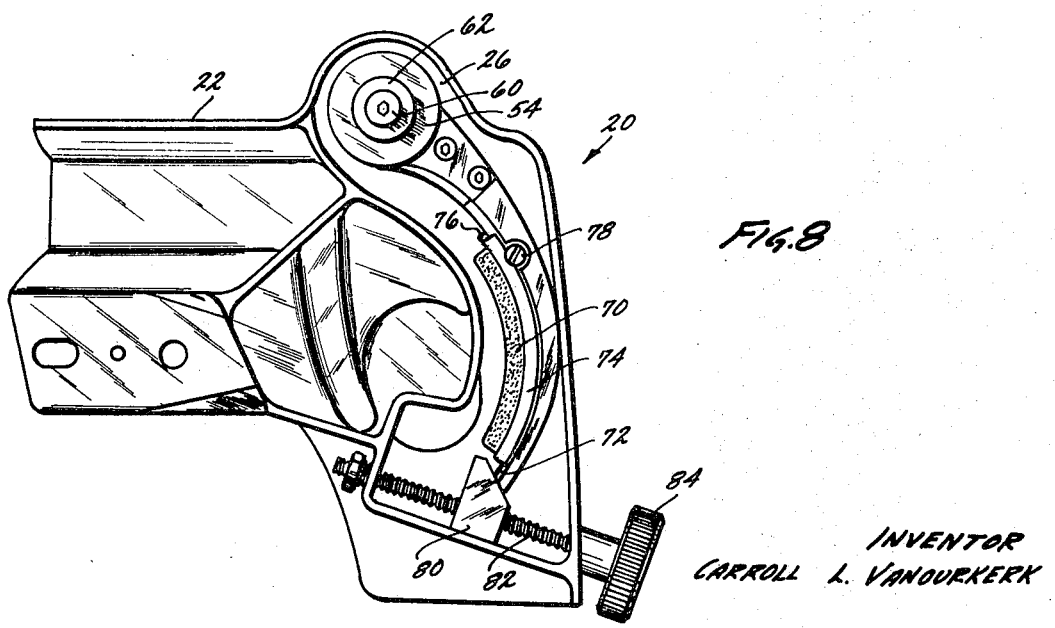
INVENTOR
CARROLL L. VANOURKERK
BY Robert L. Harrington
                ATTORNEY United States Patent Office 3,534,638
Patented Oct. 20, 1970

3,534,638
SAW CHAIN SHARPENER
Carroll L. Van Ourkerk, Milwaukie, Oreg., assignor to Omark Industries, Inc., Portland, Oreg., a corporation of Oregon
Filed Oct. 25, 1968, Ser. No. 770,751
Int. Cl. B23d 63/00
U.S. Cl. 76—25                                     5 Claims

ABSTRACT OF THE DISCLOSURE

A saw chain sharpening stone carried by an arm that is pivotally connected to a cover plate. The cover plate is adapted to be mounted to a chain saw so as to locate the sharpening stone over the cutter links of a top sharpening saw chain as the chain is driven around the drive sprocket of the chain saw. A hand crank pivots the arm and sharpening stone carried thereby against the power driven chain and continued turning of the hand crank, urges steady contact of the stone against the cutter links. The sharpening stone is retracted into a storage recess provided in the cover in response to the hand crank being folded to an inoperative position against the cover plate, and the stone is moved to its chain sharpening position in response to the hand crank being returned to an operative position.

HISTORY OF THE INVENTION

This invention relates to an attachment for chain saws for automatically sharpening the saw chain.

For many years chain saws have been the basic work tool for the timber harvesting industry. Until recently a major cause of work stoppages of the chain saw resulted from the necessity of having to periodically sharpen the saw chain. Such sharpening was done with a hand file and was both slow and tiresome. It also introduced possible cutting inefficiencies where the sharpening was done improperly. Thus a real benefit was achieved by the development of an automatic saw chain sharpening system. In an automatic saw chain sharpening system a saw chain is sharpened by filling the outer exposed surface of the cutter links of the chain as the chain is carried around the drive sprocket of the chain saw. The present invention is directed to the mechanism for performing the sharpening operation of such a sharpening system and to the means for adapting such mechanism to a conventional chain saw.

A sharpener mechanism for use in such an automatic sharpening system is disclosed in the commonly assigned co-pending U.S. patent application, Ser. No. 685,441, filed on Nov. 24, 1967, now Pat. No. 3,487,591, issued Jan. 6, 1970 in the name of Kay Silvon. In the Silvon mechanism as well as the present mechanism a sharpening stone is carried by an arm which positions the sharpening stone over the saw chain as it is carried over the drive sprocket. Rotating a hand crank urges the sharpening stone against the cutting edge of the chain and produces oscillating lateral movement of the stone.

DESCRIPTION OF THE INVENTION

The device of the present invention is believed characterized at least in part by the mechanism whereby the sharpening stone is conveniently retracted into a protective storage recess and the hand crank is folded out of the way of the operator while the chain saw is being used in its normal cutter operation. When the chain has become dulled, the operator merely unfolds the hand crank which automatically moves the sharpening stone out of the protective recess and into position over the saw chain.

In the preferred embodiment of the invention, a hand crank is connected through a linkage to one end of a shaft. The shaft is mounted for rotative movement in a tubular sleeve formed in a cover adapted for attachment to a chain saw. The other end of the shaft carries a slip clutch arrangement for uring pivotal movement of an arm, which carries the sharpening stone, toward the saw chain. The shaft is adapted for limited axial movement within the sleeve and a compression spring urges the shaft into its chain sharpening position. The linkage permits the hand crank to be pivoted about an axis perpendicular to the axis of the shaft, which pivoting draws the shaft against the force of the compression spring to retract the sharpening stone away from the saw chain and into a protective recess provided in the cover. The hand crank is pivoted against the outside of the cover and out of the way of the operator.

The above advantages and improvements of the present invention as well as additional advantages and improvements will be apparent by reference to the following detailed description and drawings wherein:

FIG. 3 is a view of the sharpener only as taken on line 3—3 of FIG. 2;

FIG. 4 is a view similar to FIG. 3 but showing the sharpening stone being retracted from its sharpening position;

FIG. 5 is a view similar to FIG. 4 but showing the sharpening stone fully retracted from its sharpening position and the hand crank being folded out of the way;

FIG. 6 is an exploded view with portion broken away showing the components of the saw chain sharpener;

FIG. 7 is an enlarged view of one of the components; and

FIG. 8 is a view of the back side of the saw chain sharpener as it appears when removed from the chain saw.

Figure 1:
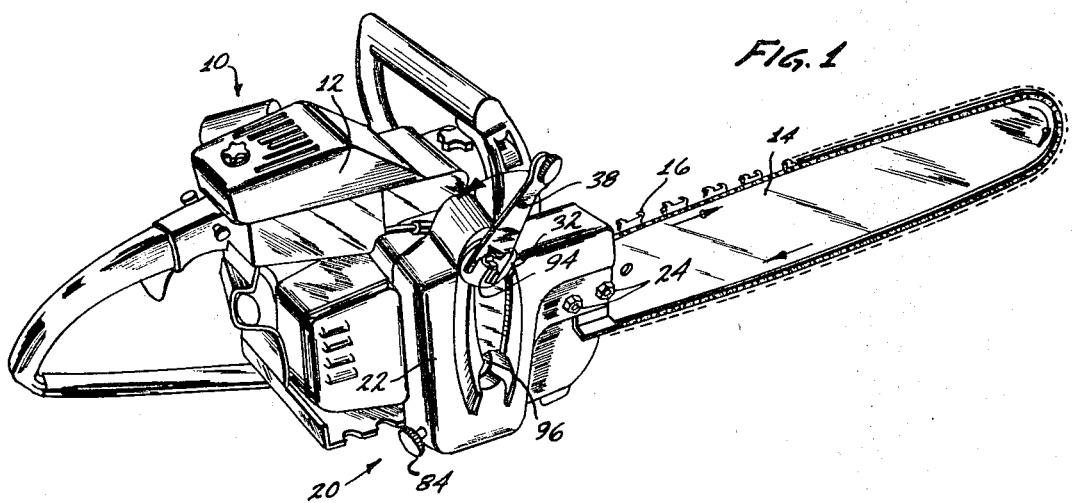
FIG. 1 is a perspective view of a saw chain sharpener of the present invention mounted on a chain saw.
Figure 2:
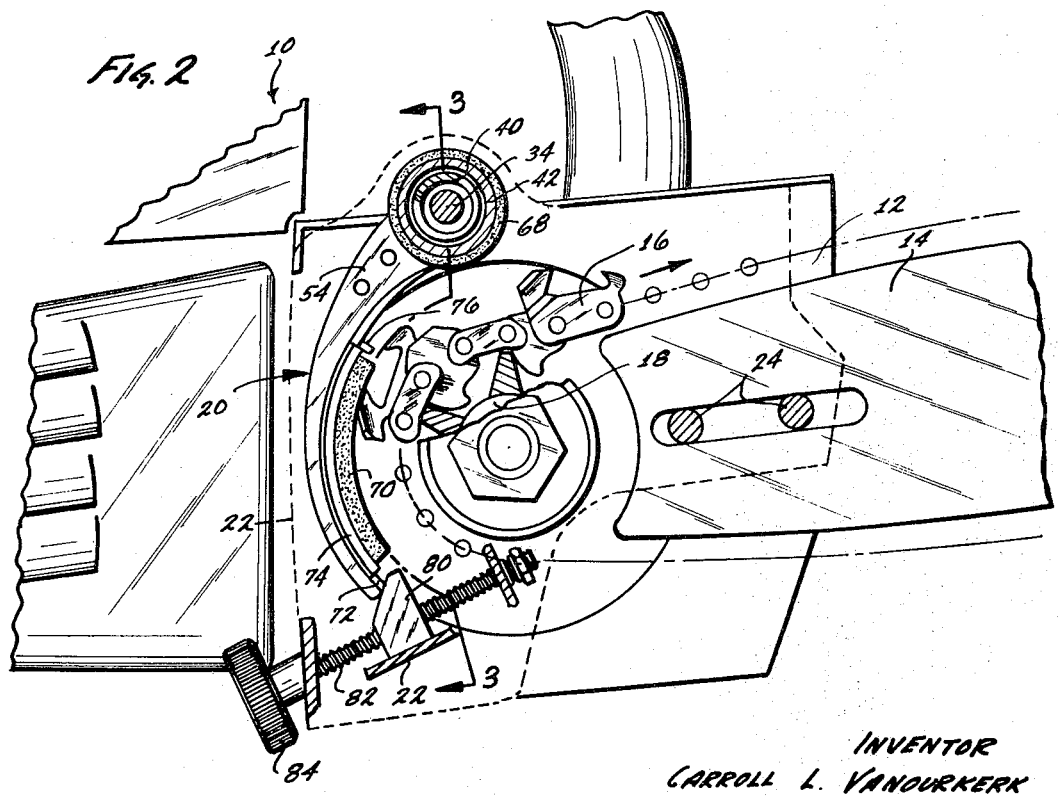
FIG. 2 shows the chain saw and saw chain sharpener of FIG. 1 with portions broken away to illustrate the operation of sharpening a saw chain.

Referring to FIG. 1 of the drawings, a chain saw 10 is comprised of a motor 12, a saw chain bar 14, attached to the housing of motor 12, a saw chain 16 mounted on the saw chain bar 14, and drive means 18 (see FIG. 2) interconnected with motor 12 for driving the saw chain 16 in a normal cutting operation.

A saw chain sharpener 20 has a cover 22 that is mounted by fastener bolts 24 to the housing of motor 12. As more clearly shown in FIGS. 3 through 8 the cover 22, which is preferably formed of a die cast metal such as aluminum, is provided with a cup portion 26 in which a tubular sleeve 28 is affixed. The outer end of the sleeve 28 is slanted inwardly in the upper direction as viewed in FIGS. 3 through 7 to form a cam surface 30. A bearing ring 32 is bonded to the outside of the cover 22 around the sleeve 28. The function of both the cam surface 30 and bearing ring 32 will be further described hereafter.

A shaft 34 is rotatably and slidably mounted in the tubular sleeve 28. A link 36 is pivotally connected at one end of the shaft 34 and interconnects therewith a hand crank 38. A coil compression spring 40 is seated in the cup portion 26 of the cover 22 around the tubular sleeve 28. A cylindrical drum 42 fits over the coil spring 40 and within the cup portion 26 of the cover. One end of the drum 42 is partially closed for containing the coil spring 40. An opening 44 in the end of the drum 42 permits passage of a reduced end 46 of the shaft 34. A pin 48 on the reduced end 46 of the shaft 34 mates with a notch 50 in the opening 44 of the drum 42 to lock the shaft and drum together. Thus as the hand crank turns the shaft 34, the drum 42 is caused to turn.

The drum 42 nests in a recess 52 formed in an arm 54. An opening 56 in the bottom of the recess 52 permits passage of the reduced end 46 of the shaft 34 but not the pin 48. A bore 58 in the end of the shaft 34 is threaded and a screw 60, with spring washer 62, securely fastens the arm 54 to the shaft 34 but so that relative rotative movement is permitted between the drum 42 and the arm 54. A gripping disk 64 on the end of the drum 42 urges rotation of the arm but permits slippage where such rotation is resisted. A felt strip 66 is provided around the lip of the cup portion 26 and strip 68 is provided around the lip of the recess 52 to provide lubricative action to the relative rotative movement of the respective components.

The arm 54 is curved to substantially conform to the curvature of the saw chain and has a track 72 formed on the curved inside edge. A sharpening stone 70, also curved to conform to the saw chain, has a metal backing forming side rails 74 that mate with the track 72. A stop screw 76 positions the stone properly on the arm 54 and a lock screw 78 firmly locks the sharpening stone onto the arm.

An adjustable setting block 80 determines the setting at which the sharpening stone is allowed to grind into the saw chain. An adjusting screw 82 is rotatably mounted to the cover 22 and the setting block 80 is threadably engaged with the adjusting screw 82. A knob 84 on one end of the adjusting screw enables the screw to be turned by the chain saw operator. The setting block 80 is prevented from turning by reason of its abutment against the cover and is thus moved axially along the screw. A pin 86 on the free end of the arm 54 is adapted to abut against the setting block 80 to limit the movement of the sharpening stone toward the saw chain.

With the hand crank 38 in operative position as shown in FIG. 3 the coil spring 40 urges the arm 54 with sharpening stone 70 to an inner extended position where the sharpening stone 70 is aligned with the saw chain 16. Counterclockwise turning of the hand crank 38 as viewed in FIGS. 1 and 2 pivots the arm 54 with sharpening stone 70 toward the saw chain 16. The cutting edges of the saw chain engages the sharpening stone as the chain is driven around the drive means 18. The setting block 80 limits the amount of metal that the sharpening stone is permitted to grind off the cutting edges of the saw chain. The hand crank 38 is turned continuously with the drum 42 slipping within the recess 52 of the arm 54, but applying continuous urging of the sharpening stone against the saw chain. As the hand crank 38 is turned, a cam follower 88 on the link 36 rides on the cam surface 30 of the tubular sleeve 28. The coil spring forces the shaft to maintain contact of the cam follower 88 on the cam surface 30 so that as the hand crank is turned, the shaft 34 is forced in and out in an oscillating manner to work the sharpening stone back and forth across the cutting edge of the saw chain. This avoids the undesired wearing grooves in the sharpening stone.

When the saw chain is sharpened and the chain saw is returned to its normal cutting operation, it is desirable to move the sharpening stone to a position where it cannot interfere with the cutting operation of the saw chain. Also it is desirable for the hand crank to be stored out of the way of the chain saw operator. Referring to FIG. 4, with the hand crank 38 in its uppermost position the free end of the hand crank is forced outwardly by the operator to pivot the hand crank about its pivotal connection with the link 36. An extended portion 90 opposite the handle 91 engages the bearing ring 32 and acts as a lever to force the shaft 34 against the force of the coil spring 40. The extended portion 90 and the link 36 are so related that when the hand crank is moved into alignment with the shaft 34, the link 36 is completely withdrawn from the tubular sleeve 28. In continuing to fold the hand crank as shown in FIG. 5, a bar 92 provided on the hand crank 38 engages a neck portion 94 of the link 36 and forces it to pivot with the hand crank as permitted by the pivotal connection between the shaft 34 and the link 36.

The cover 22 is provided with a relief 96 as shown in FIG. 1 which receives the folded hand crank as seen in FIG. 5. In unfolding the hand crank, the link 36 is unfolded until it is aligned with the tubular sleeve 28, whereupon it is drawn by the coil spring 40 into the tubular sleeve. The clearance between the link and the tubular sleeve is such that although the link clears the tubular sleeve at the low point of cam 30, it does not clear the high point and the link cannot be unfolded beyond the point where it aligns with the tubular sleeve.

It will be understood that the above described apparatus exemplifies the invention and is not intended to limit the scope of the invention. Persons skilled in the art having knowledge of the invention will be able to suggest numerous variations and modifications and thus the invention is to be limited only in accordance with the claims appended hereto.

What is claimed is:

1. A saw chain sharpener for a chain saw comprising a cover, a shaft rotatably mounted to the cover, a sharpening stone adapted for sharpening the cutting edges of a saw chain while being driven in the chain saw, an arm having one end pivotally connected to the shaft, slip clutch means for urging pivotal movement of the arm as the shaft is rotated, said sharpening stone mounted on the arm whereby such pivotal movement pivots the sharpening stone against the saw chain, a hand crank mounted to the shaft to impart rotative movement thereto, folding means for folding the hand crank to an operative position, and retracting means responsive to said folding means for retracting the sharpening stone.

2. A saw chain sharpener for a chain saw as defined in claim 1 wherein the shaft is rotatably and slidably mounted to the cover, said retracting means including biasing means for slidably biasing the shaft to a position where the sharpening stone is aligned with the saw chain, said folding means forcing sliding movement of the shaft against the force of the biasing means to retract the sharpening stone.

3. A saw chain sharpener for a chain saw as defined in claim 2 wherein a tubular sleeve is affixed to the cover and said shaft is mounted for slidable rotative movement therein, said tubular sleeve having a cam surface on the end adjacent the hand crank, and a cam follower on the hand crank adapted to ride in said cam surface as the hand crank is rotated for producing oscillating back and forth movement of the shaft and sharpening stone carried thereby.

4. A saw chain sharpener for a chain saw as defined in claim 3, wherein the folding means includes a linkage interconnecting the shaft and hand crank, said linkage being comprised of a connecting link having a pivotal connection at one end to the shaft and a pivotal connection at the other end to the hand crank, said connecting link adapted to be housed in the tubular sleeve when the hand crank is in operative position, a lever portion on the hand crank extends past the pivotal connection for forcing axial movement of the connecting link and shaft connected thereto when the hand crank is folded, said folding means including limiting means for limiting the relative pivotal movement of the connecting link and hand crank when the connecting link is withdrawn from the tubular sleeve whereby continued folding of the hand crank produces pivoting at the connection of the connecting link and shaft to lock the shaft and sharpening stone in the retracted position.

5. A saw chain sharpener for a chain saw as defined in claim 3 wherein said biasing means includes a compression coil spring around the tubular sleeve and having one end abutted against the cover, a drum enclosing the other end of the coil spring, a friction gripping disc on the end of the drum, said arm having a recess portion adapted to receive the drum, said drum being rigidly fastened to the shaft and said arm being pivotally connected to the shaft with pivotal movement of the arm being urged by the friction gripping disc engaging the arm within the recess.

References Cited
UNITED STATES PATENTS 3,147,644   9/1964   Oehrli _____ 76—37

BERNARD STICKNEY, Primary Examiner

U.S. Cl. X.R.

51—241; 76—37; 143—32